United States Patent
Andersson

(10) Patent No.: US 7,987,691 B2
(45) Date of Patent: Aug. 2, 2011

(54) METHOD AND A DEVICE FOR THE MANUFACTURING OF WASHERS AND WASHER FOR A LOCKING SYSTEM

(75) Inventor: Mattias Andersson, Östersund (SE)

(73) Assignee: Nord-Lock AB (SE)

( * ) Notice: Subject to any disclaimer, the term of this patent is extended or adjusted under 35 U.S.C. 154(b) by 472 days.

(21) Appl. No.: 11/921,355

(22) PCT Filed: May 30, 2006

(86) PCT No.: PCT/SE2006/050165
§ 371 (c)(1),
(2), (4) Date: Nov. 30, 2007

(87) PCT Pub. No.: WO2006/130106
PCT Pub. Date: Dec. 7, 2006

(65) Prior Publication Data
US 2009/0036224 A1 Feb. 5, 2009

(30) Foreign Application Priority Data
May 31, 2005 (SE) .................................. 0501224

(51) Int. Cl.
*B21J 11/00* (2006.01)
*B21D 53/20* (2006.01)
(52) U.S. Cl. ........................................... 72/404; 470/41
(58) Field of Classification Search .................. 72/325, 72/330, 404, 452.1; 470/41, 42, 162, 163
See application file for complete search history.

(56) References Cited

U.S. PATENT DOCUMENTS

| 2,352,118 | A |   | 6/1944 | Poupitch |
| 4,134,438 | A | * | 1/1979 | Frieberg et al. ............... 411/163 |
| 5,409,338 | A |   | 4/1995 | McKinlay |
| 6,896,465 | B2 |  | 5/2005 | Andersson |

FOREIGN PATENT DOCUMENTS

| CN | 2559823 Y | 7/2003 |
| DE | 684466 | 11/1939 |
| DE | 4425837 | 1/1996 |
| GB | 553383 | 5/1943 |
| SE | 517379 | 6/2002 |
| WO | WO-2006/130106 A1 | 12/2006 |

OTHER PUBLICATIONS

"PCT Application No. PCT/SE2006/050165, International Search Report mailed Aug. 30, 2006", 5 pgs.
"PCT Application No. PCT/SE2006/050165, Written Opinion mailed Aug. 30, 2006", 5 pgs.
"Chinese Application Serial No. 2006800193794, Second Office Action dated Jul. 6, 2010", (English Translation), 6 pgs.

* cited by examiner

*Primary Examiner* — Teresa M Ekiert
(74) *Attorney, Agent, or Firm* — Schwegman, Lundberg & Woessner, P.A.

(57) ABSTRACT

Various embodiments include a method for the manufacturing of washers for locking, each washer having a central hole, a first side comprising a pattern of radially extending teeth and a second side comprising a pattern of radially extending cams, the method comprising forming each washer in successive operations from a washer blank strip, a washer being punched out in a final punching operation. Various embodiments include forming and providing one side of the washer with a flat surface edge zone extending radially outside the pattern of this washer side and punching out the washer with a punch acting against at least a part of said flat surface. Embodiments of the invention also relate to a device for the manufacturing of washers and a washer.

7 Claims, 6 Drawing Sheets

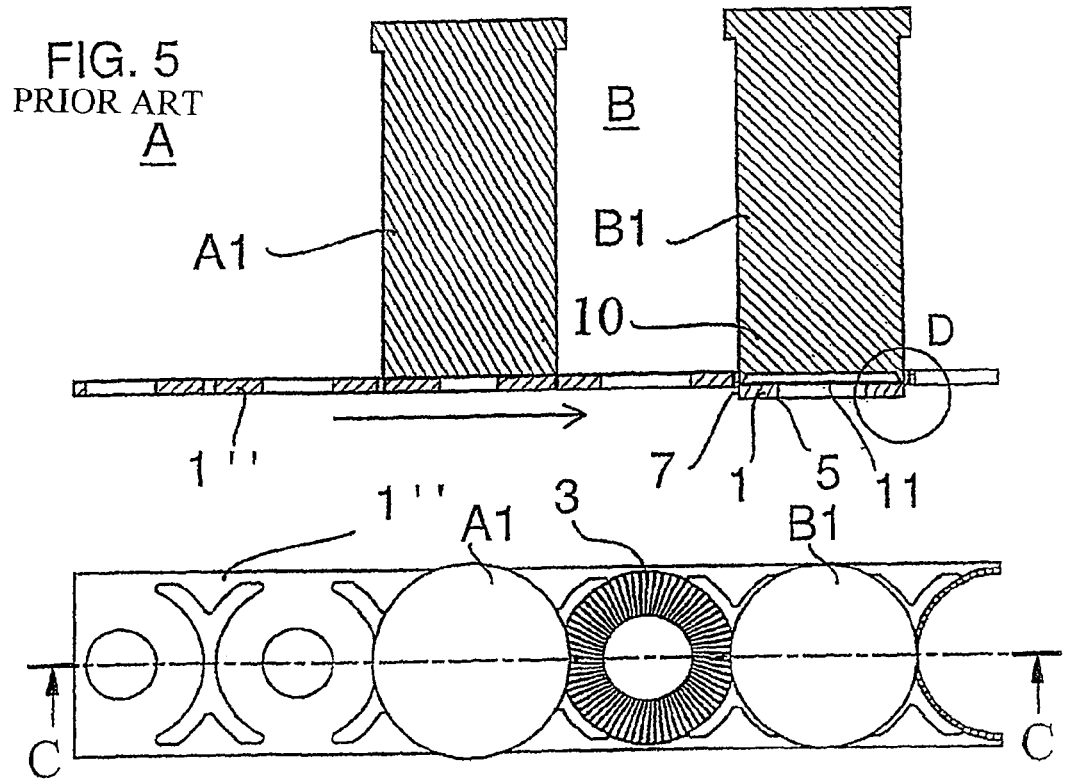
FIG. 5 PRIOR ART
FIG. 6 PRIOR ART
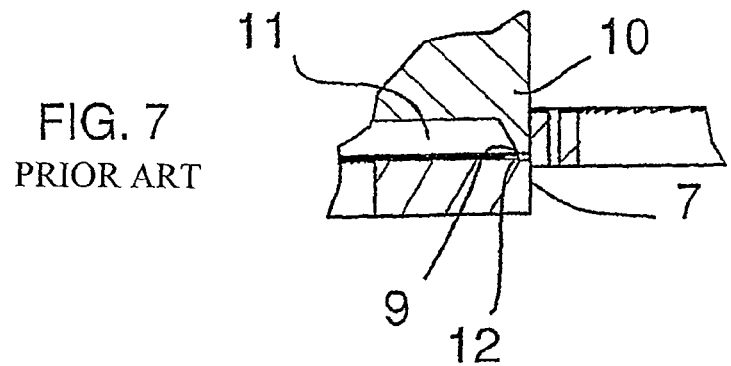
FIG. 7 PRIOR ART

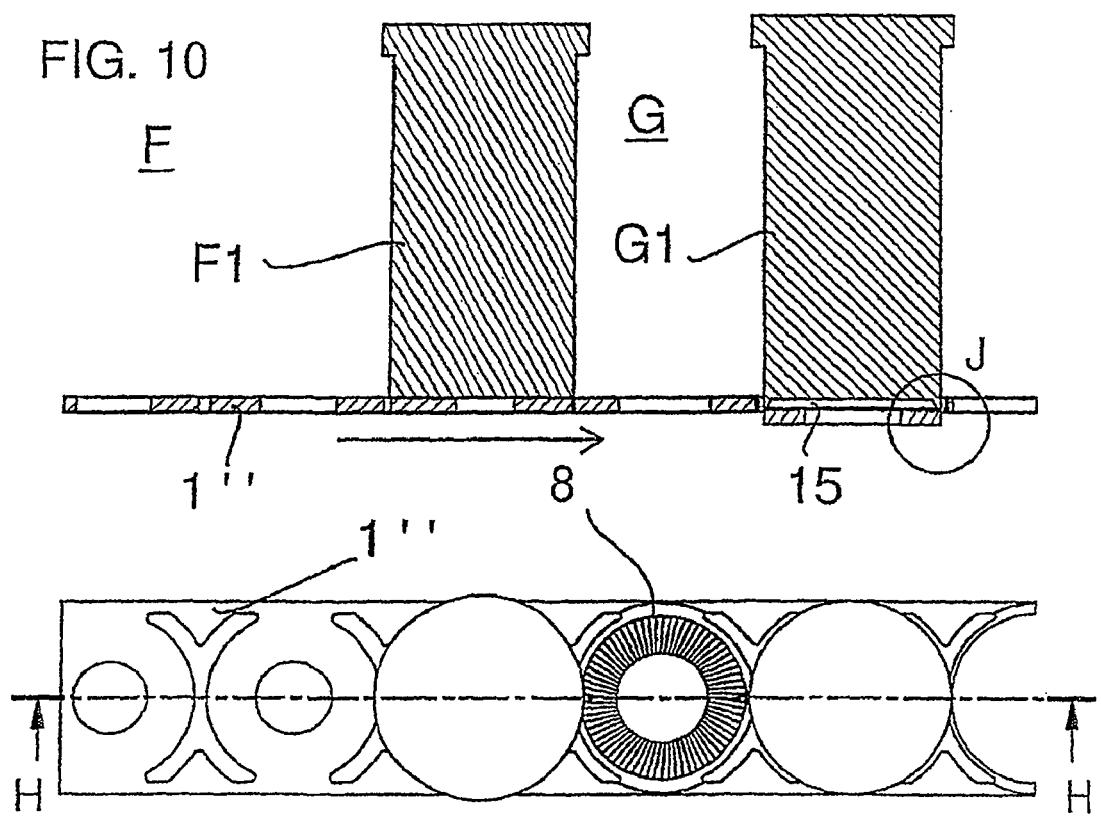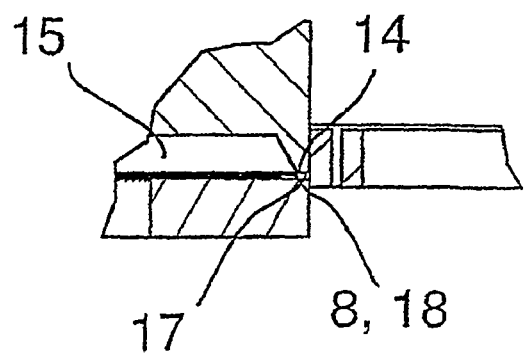

METHOD AND A DEVICE FOR THE MANUFACTURING OF WASHERS AND WASHER FOR A LOCKING SYSTEM

RELATED APPLICATIONS

This application is a nationalization under 35 U.S.C. 371 of PCT/SE2006/050165, filed May 30, 2006 and published as WO 2006/130106 A1 on Dec. 7, 2006, which claimed priority under 35 U.S.C. 119 to Sweden Patent Application Serial No. 0501224-0, filed May 31, 2005; which applications and publication are incorporated herein by reference and made a part hereof.

1. BACKGROUND 1.1 Technical Field

The present invention relates to a method for the manufacturing of washers according to the inventory part of claim 1.

The invention further relates to a device for the manufacturing of washers.

The invention also relates to a washer for a locking system.

1.2 Prior Art

Washers of substantially the kind specified above are previously known and provided for eg bolts or the corresponding fastening elements for locking purposes.

Figure 1:
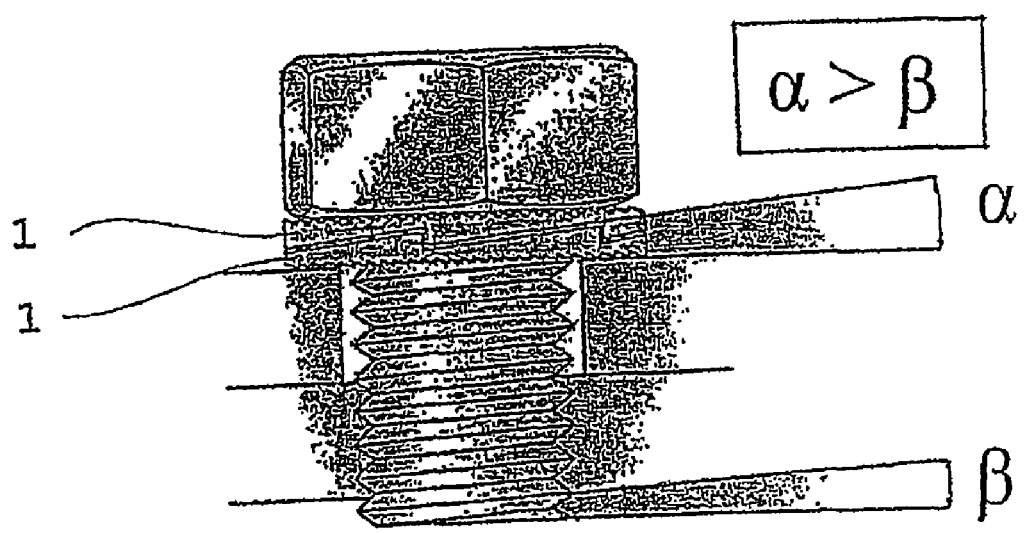

Two washers are arranged in a pair, substantially as shown in FIG. 1, the cam pattern sides facing and engaging each other, the main cam surface inclination being larger than the pitch of the threads, which causes a positive and efficient locking of the fastening element.

The washers are manufactured from a strip blank, which is fed to pass several stations, in which forming and/or punching is performed between upper and lower tools, the pattern of teeth being formed on and covering the upper surface and the cam pattern being formed on and covering the lower surface of the washer.

The final operation is the punching out of the washer outer periphery by an upper punch against the upper surface of the washer. This punching operation has proved to cause severe wear in the outer punch periphery region, which calls for frequent punch exchange, which disturbs the production and lowers the productivity.

The purpose of the present invention is to provide a solution to the above referenced problems.

2. SUMMARY OF THE INVENTION

The purpose specified above is obtained by a method according to the attached claim 1.

Further advantages are offered by what is specified in the dependent claims.

3. BRIEF DESCRIPTION OF THE DRAWINGS

Figure 2:
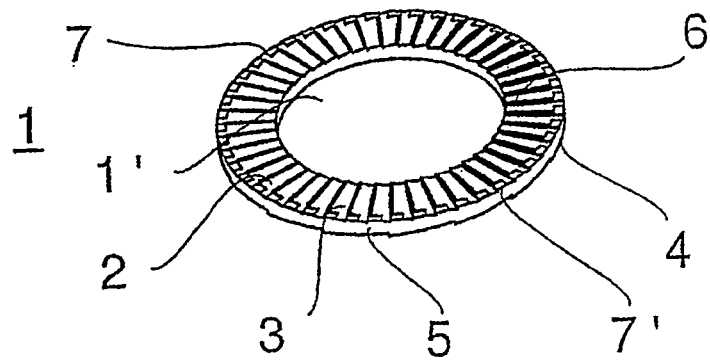
Figure 3:
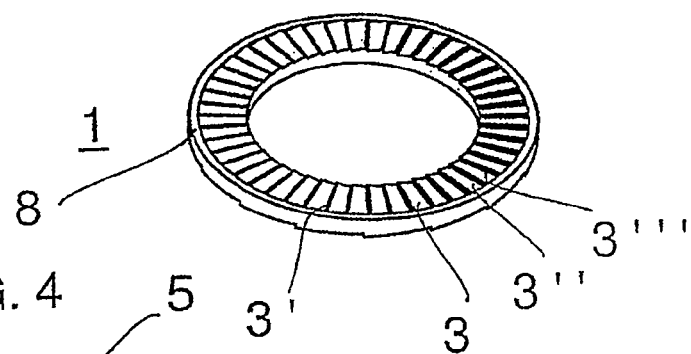
Figure 4:
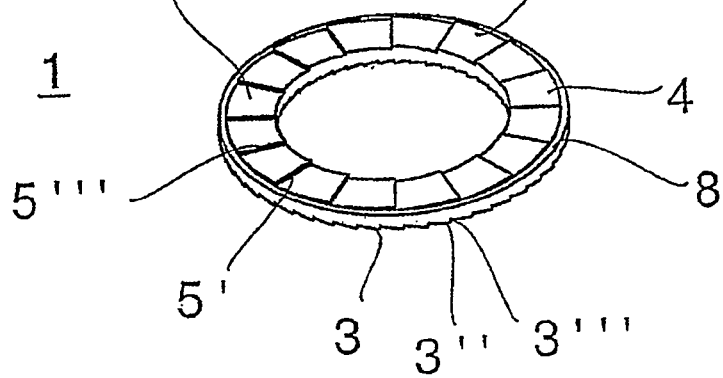
Figures 8, 9:
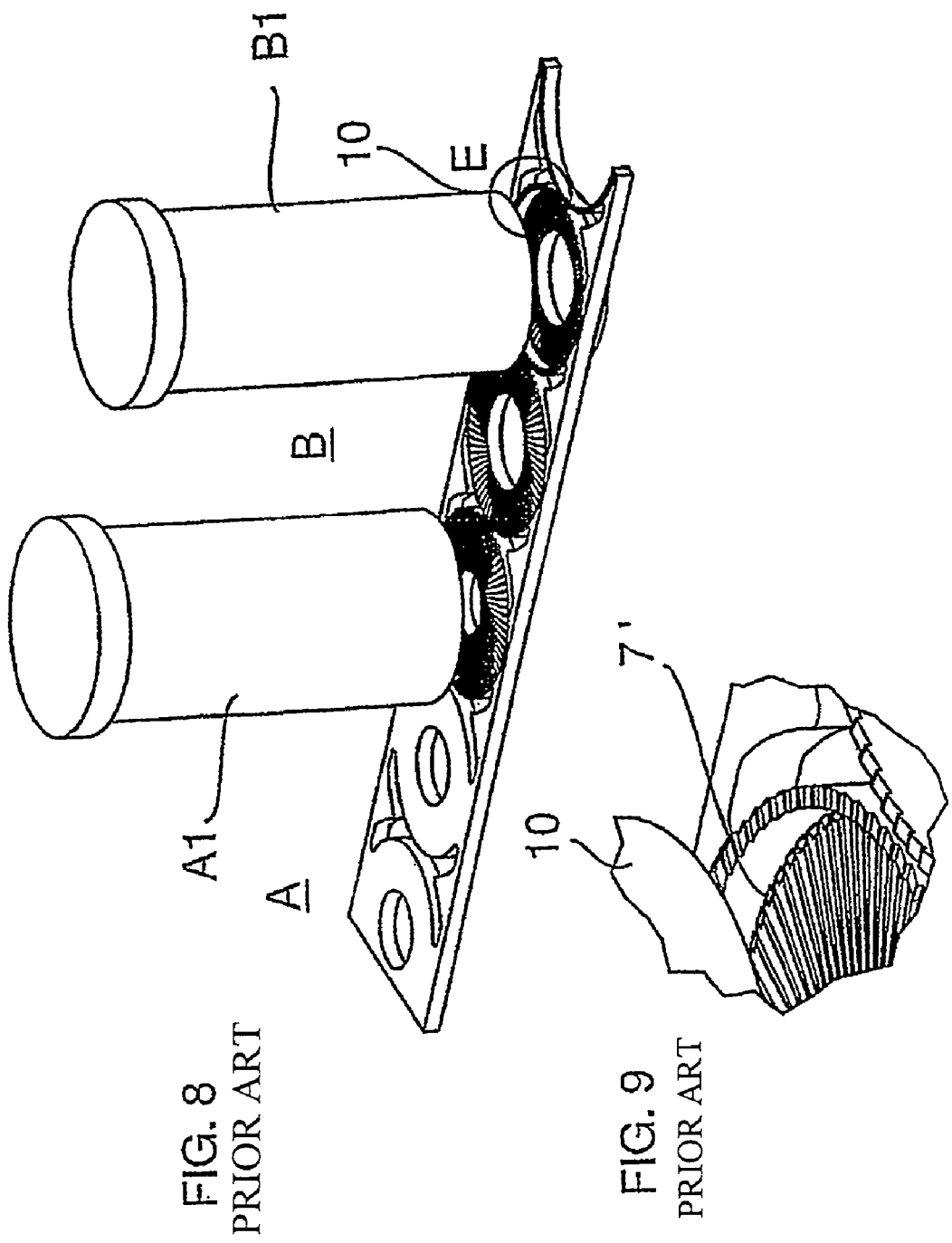
Figures 13, 14:
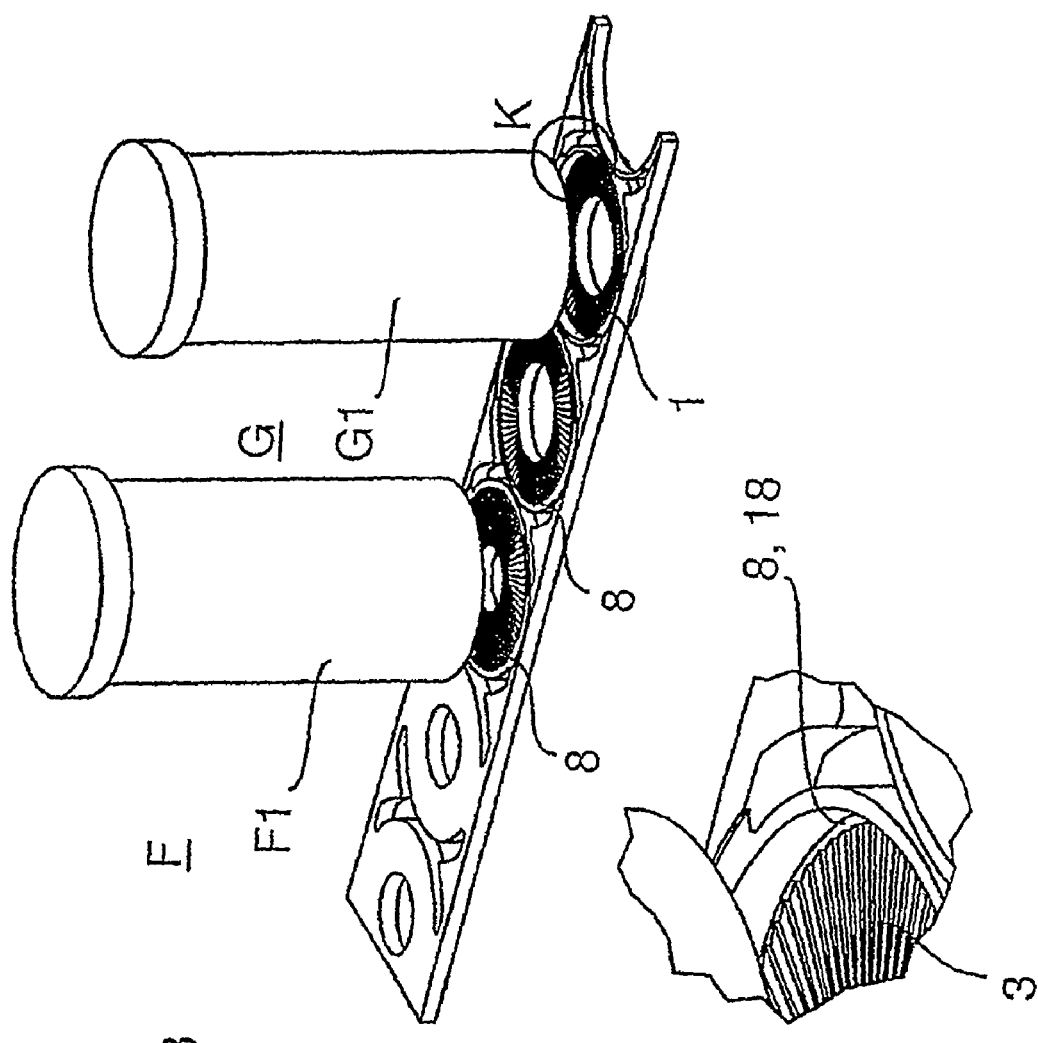

A better understanding of the present invention will be had upon the reference to the following detailed description when read in conjunction with the accompanying drawings, wherein like reference characters refer to like parts throughout the several views, and in which FIG. 1 shows in a schematic view of a prior art bolt securing system employing a pair of washers, FIG. 2 shows in a perspective view a known washer showing peripheral irregularities, the formation of which contributes to extensive punch wear, FIG. 3 shows a first embodiment of a washer according to the present invention in a perspective view, FIG. 4 shows a second embodiment of a washer according to the present invention in a perspective view, FIG. 5 shows in a cross-section C-C according to FIG. 6 two punching operations according to a prior art process for washer manufacturing, FIG. 6 shows the punching operations according to FIG. 5 seen from above in FIG. 5, FIG. 7 shows an enlarged detail D according to FIG. 5, FIG. 8 shows in a perspective view the punching operations according to FIG. 5, FIG. 9 shows a detail E according to FIG. 8, FIG. 10 shows in a cross-section H-H according to FIG. 11 two punching operations according to the invention, FIG. 11 shows the punching operations according to FIG. 10 seen from above in FIG. 10, FIG. 12 shows an enlarged detail J according to FIG. 10, FIG. 13 shows in a perspective view the punching operations according to FIG. 10, FIG. 14 shows a detail K according to FIG. 13.

4. DETAILED DESCRIPTION OF PREFERRED EMBODIMENTS OF THE INVENTION

In FIG. 2, 1 designates a prior art washer having a central hole 1', on one side 2, a first side and the upper side in the manufacturing process, a pattern of teeth 3 and on the other side 4, a second side and the lower side in the manufacturing process, a pattern of cams 5, both patterns running from the inner periphery 6 of the washer to the outer periphery 7. 7' designates irregularities, defects, at the outer periphery, these being caused by a punch, as described later.

In FIG. 3, showing a first embodiment of a washer according to the invention, the washer is formed and provided with a flat surface edge zone 8, i.e. a surface without a pattern of teeth, extending radially outside the pattern of teeth, against which surface the punch is arranged to act upon punching, at least a flat surface edge zone 8 part being present on the washer as punched out.

The configuration of the washer flat surface edge zone may be such that the flat surface extends on the same level as the top 3' of the teeth or lower, as shown eg in FIG. 3.

According to a second embodiment of a washer according to the invention, FIG. 4, the washer is formed with the cam pattern on the upper side in the manufacturing and is cut out against this side. Also in this case the washer is formed and provided with a flat surface edge zone 8 extending radially outside the cam pattern, against which surface the punch is arranged to act upon punching, at least a part of the flat surface being present on the washer as punched out.

In this case the configuration of the washer flat surface edge zone should be such that the flat zone extends at or below the cam pattern bottom 5', since the cam patterns of two identical washers facing each other must engage. The washers may be non-identical but this is not advantageous from several points of view.

In FIGS. 5-9 parts of the prior art process for manufacturing prior art washers is shown. The process comprises feeding a pre-punched washer blank strip 1" to a forming punching operation A, in which the pattern of teeth 3 is formed by an upper punch A1 and the pattern of cams 5 is formed by a lower punch or die, not shown. For clarity, pre-punching operations as well as an operation for punching out the inner periphery of the washers have been left out. B designates a final punching operation arranged after the forming punching operation, in which final punching operation washers are intend to be punched out against a lower die, not shown, by an upper punch B1. The pattern of teeth formed extends beyond the outer periphery of the finished washer. As can be seen in FIGS. 5 and 7, the punch B1 of the final punching operation comprises a peripheral cutting edge portion 9 in the punching end 10 of the punch, the cutting edge running about a central recess 11 in the punch end and having an annular flat bottom surface 12 provided to act against the pattern of teeth of the washer to be in a cutting action for cutting out the washer as can be seen in FIGS. 5, 7, 8 and 9. The cutting action against the pattern of teeth causes wear of the cutting edge as well as undesired indentations, irregulations, 7'. FIG. 9, in the top parts of the teeth in the peripheral zone of the pattern of teeth. Wear of the cutting edge is especially severe in a pattern of teeth configuration as shown in FIGS. 6, 8 and 9, in which the teeth are closely packed in the circumferential direction of the washer, the teeth following directly one after the other in said direction.

In FIGS. 10-13 parts of a process according to the invention for manufacturing washers according to the invention is shown, pre-punching operations and inner periphery punching operation having been left out. Also in this case the process comprises feeding a pre-punched washer blank strip 1" to a forming punch operation F, in which the pattern of teeth 3 is formed by an upper punch F1, and the pattern of cams 5 is formed by a lower punch or die, not shown. According to the invention the upper punch F1 is designed for forming a flat surface edge zone 8 extending radially and running circumferentially outside the pattern of teeth. In a final punching operation G arranged after the forming punching operation, washers are intended to be punched out against a lower die, not shown. According to the invention the punch G1, having a peripheral cutting edge portion 14 running about a central recess 15 in the punch end 1 and having an annular flat bottom surface 17 provided to act against at least an inner part 18 of the flat surface edge zone outside the pattern of teeth in a cutting action, as can be seen in eg FIGS. 12 and 14, whereby a clean punching cut is obtained. In a corresponding way the second embodiment of a washer, FIG. 4, is manufactured for the provision of a clean punching cut.

The method and the function of the device as well as the washer according to the invention should to a satisfactory extent have been disclosed by the description given above.

Thus, the washer is formed with a flat surface edge zone 8 extending radially outside the washer side pattern and is punched out by a punch G1 action against this surface, this providing a clean punching cut operation corresponding to a punching operation for eg a flat strip, which operation causes much less wear of the punch cutting edge than if the cut is performed against a surface with a pattern of teeth or cams.

Above the invention has been described by means of example and preferred embodiments.

Of course further embodiments and minor changes and additions may be imagined without departing from the basic inventive idea.

According to preferred embodiments each cam 5 of the cam side 4, FIG. 4 eg, has a main cam surface 5" provided with an inclination larger that the pitch of the threads, as described earlier, and a steeply, preferably axially, running surface 5'" connecting two adjacent main cam surface 5".

Further according to preferred embodiments each tooth 3, FIG. 3 eg, has a main surface 3", being inclined contrary to the main cam surfaces in a wedge-like configuration, and a steeply, at least close to axially, running surface 3'" connecting two adjacent tooth main surfaces 3".

Preferably, each cam main surface 5' is via a steeply running surface 5'" directly connected to the adjacent main cam surface 5". Furthermore, each main tooth surface 3", is via a steeply running surface 3'" directly connected to the adjacent main tooth surface 3'. Embodiments may, however, be imagined according to which, at least as far as the pattern of teeth is concerned, a certain minor distance, not shown, in the circumferential direction is provided between the teeth. Preferably this distance is less than the tooth extension in the circumferential direction.

Thus, the invention should not be considered limited to the examples and embodiments shown but may be varied within the scope of the accompanying claims.

The invention claimed is:

1. A method for the manufacturing of washers for locking, each washer having a central hole, a first side comprising a pattern of radially extending teeth and a second side comprising a pattern of radially extending cams, the method comprising:

forming each washer in successive operations from a washer blank strip, each washer being punched out in a final punching operation, the forming including, forming in a first forming punching operation the pattern of radially extending teeth on the first side of the washer and the pattern of radially extending cams on the second side of the washer, and further including forming a flat surface edge zone on either the first side or the second side of the washer, wherein the flat surface edge zone extends radially outside the pattern of radially extending teeth when formed on the first side, and wherein the flat surface edge zone extends radially outside the pattern of radially extending cams when formed on the second side, and in the final punching operation performed after the first forming punching operation, punching out the washer with a punch acting against at least a part of the flat surface edge zone.

2. The method according to claim 1, wherein the first side is formed in the first forming punching operation by an upper punch.

3. The method according to claim 1, wherein the punch acting against at least the part of the flat surface edge zone is an upper punch.

4. The method according to claim 1, wherein punching out the washer in the final punching operation includes the punch having a cutting punch end including a cutting edge portion running about a central recess and a flat bottom surface acting against at least an inner part of said flat surface edge zone in a cutting action.

5. The method according to claim 1, wherein forming the plurality of radially extending teeth further includes:

forming a plurality of adjacent teeth formed so that the plurality of adjacent teeth follow directly after each other in a circumferential direction.

6. The method according to claim 1, wherein forming the pattern of radially extending teeth includes forming the pattern of radially extending teeth so that a certain minor distance in a circumferential direction is provided between at least one first tooth and a second tooth adjacent to the at least one first tooth in the pattern of radially extending teeth.

7. The method according to claim 6, wherein the certain minor distance is less than a distance of a tooth extension in a circumferential direction.

* * * * *